United States Patent
Lin et al.

(10) Patent No.: US 7,738,713 B2
(45) Date of Patent: Jun. 15, 2010

(54) METHOD FOR PROCESSING DIGITAL IMAGE WITH DISCRETE WAVELET TRANSFORM AND APPARATUS FOR THE SAME

(75) Inventors: Zhi-Xin Lin, Chia-Yi (TW); Jinn-Shyan Wang, Chia-Yi (TW); Ching-Wei Yeh, Electrical Engineering Department of CCU, 5F-5, 168 San-Hsing, Ming-Hsiung, Chia-Yi (TW)

(73) Assignee: Ching-Wei Yeh, Ming-Hsiung, Chia-Yi (TW)

( * ) Notice: Subject to any disclaimer, the term of this patent is extended or adjusted under 35 U.S.C. 154(b) by 925 days.

(21) Appl. No.: 11/513,277

(22) Filed: Aug. 31, 2006

(65) Prior Publication Data

US 2008/0056372 A1 Mar. 6, 2008

(51) Int. Cl.
*G06K 9/46* (2006.01)
(52) U.S. Cl. ...................................... 382/232
(58) Field of Classification Search .................. 382/232
See application file for complete search history.

(56) References Cited

U.S. PATENT DOCUMENTS

| | | | | |
|---|---|---|---|---|
| 6,148,111 A * | 11/2000 | Creusere | ..................... | 382/240 |
| 6,922,491 B2 * | 7/2005 | Yip | ............................ | 382/260 |
| 6,975,753 B2 * | 12/2005 | Matsuura et al. | ............. | 382/132 |
| 7,236,997 B2 * | 6/2007 | Nakayama | ................... | 708/300 |
| 7,277,489 B1 * | 10/2007 | Andrew | ................. | 375/240.19 |
| 7,333,663 B1 * | 2/2008 | Schumacher | ................ | 382/240 |
| 7,346,640 B2 * | 3/2008 | Katayama | .................... | 708/402 |
| 7,480,416 B2 * | 1/2009 | Liao et al. | .................... | 382/240 |
| 7,574,064 B2 * | 8/2009 | Hou | ........................... | 382/240 |
| 2002/0168113 A1 * | 11/2002 | Nakayama | ................... | 382/240 |
| 2003/0108248 A1 * | 6/2003 | Huang et al. | ................ | 382/240 |
| 2004/0223655 A1 * | 11/2004 | Liao et al. | .................... | 382/240 |
| 2007/0009171 A1 * | 1/2007 | Nakashizuka et al. | ........ | 382/263 |

OTHER PUBLICATIONS

Efficient VLSI—wavelet transform, Gab et al. Springer, ACSAC 2005, LNCS 3740, pp. 795-804.*
Discrete wavelet transform—image applications, Andreas et al, SPIE, 0277-786X/05, 2005, pp. 142-151.*

* cited by examiner

*Primary Examiner*—Samir A. Ahmed
*Assistant Examiner*—Jayesh Patel
(74) *Attorney, Agent, or Firm*—Muncy, Geissler, Olds, & Lowe, PLLC

(57) ABSTRACT

An apparatus for processing an image with a discrete wavelet transform is provided. For one-dimensional circuit, the method changes conventional image data processing flow and uses common product of sequential calculations with respect to the time axis. The calculations for input data are not repeated so that components of the hardware architecture are minimized. For two-dimensional circuit, the method uses an external data scanning method to eliminate an external memory, transposing buffer, from a transforming circuit.

9 Claims, 17 Drawing Sheets

METHOD FOR PROCESSING DIGITAL IMAGE WITH DISCRETE WAVELET TRANSFORM AND APPARATUS FOR THE SAME

BACKGROUND

1. Field of Invention

The present invention relates to a digital image processing method and apparatus. More particularly, the present invention relates to a digital image processing method and apparatus using discrete wavelet transform (DWT) algorithm.

2. Description of Related Art

The Discrete Wavelet Transform (DWT) provides excellent characteristics in time-frequency domain analysis and has been extensively used in many applications. Those applications include image compression, biomedical image processing, and signal analysis etc. Even the latest static image encoding/decoding standard, JPEG 2000, chose a kind of DWT, called lifting-based DWT as its core computation algorithm. The DWT module is one of the sophisticated and complex modules used in designing JPEG 2000 hardware architecture.

With reference to FIG. 1, different kinds of DWT circuits have been developed and published and the DWT has been extensively used in the image processing field. The lifting scheme is one of the most referenced and modified DWT. The disadvantage of the lifting scheme DWT is that the critical path is too long. The critical path has a computation delay time of four multipliers and eight adders.

The detailed algorithm of the forward 9/7 lifting scheme discrete wavelet transform is, $$\text{step 1: } Y(2n+1) \leftarrow X_{ext}(2n+1) + \alpha \times [X_{ext}(2n) + X_{ext}(2n+2)] \quad (1)$$

$$\text{step 2: } Z(2n+2) \leftarrow X_{ext}(2n+2) + \beta \times [Y(2n+1) + Y(2n+3)] \quad (2)$$

$$\text{step 3: } H(2n+3) \leftarrow Y(2n+3) + \gamma \times [Z(2n+2) + Z(2n+4)] \quad (3)$$

$$\text{step 4: } L(2n+4) \leftarrow Z(2n+4) + \delta \times [H(2n+3) + H(2n+5)] \quad (4)$$

$$\text{step 5: } H_{out}(2n+3) \leftarrow (-K) \times H(2n+3) \quad (5)$$

$$\text{step 6: } L_{out}(2n+4) \leftarrow \frac{1}{K} \times L(2n+4) \quad (6)$$

and the coefficients, $$\begin{cases} \alpha = -1.586134342 \\ \beta = -0.052980118 \\ \gamma = 0.882911075 \\ \delta = 0.443506852 \\ K = 1.230174105 \end{cases}$$

wherein, $X_{ext}$ represents source image data, $H_{out}$ represents high pass output, Lout represents low pass output, and the coefficients Y, Z, H and L are temporary values during the computation and must be provided for the next computation step. Y(n) represents the Y number of n-th wavelets in the algorithm.

Refer to FIG. 2. FIG. 2 illustrates an analytic diagram of the forward 9/7 discrete wavelets transform. FIG. 2 clearly shows that the data are aggregated at even time terms T(2n) to process along the time axis, while there are no computations at odd time terms T(2n+1) along the time axis where the system waits for associated data for processing at those odd time terms.

Refer to FIG. 3. FIG. 3 illustrates an analytic diagram of another modified DWT, called pipeline lifting scheme. The pipeline lifting scheme shortens the critical path of the lifting scheme, but uses eight registers. Although, the pipeline lifting scheme overcomes the problem of the lifting scheme, the circuit area is increased because of the presence of the registers.

Refer to FIG. 4. FIG. 4 illustrates an analytic diagram of another kind of DWT, called flipping scheme. The flipping scheme is developed based on the lifting scheme. The flipping scheme removes multiplication of some computation steps from the algorithm so as to remove the multipliers from the critical path. Comparing the flipping scheme with the lifting scheme, the critical path of the lifting scheme is accumulated by the computation time of the four multipliers and eight adders, and the critical path of the flipping scheme is accumulated by the computation time of one multiplier and five adders. Therefore, the flipping scheme shortens the critical path of the lifting scheme by removing the multipliers.

Furthermore, a number of temporal coefficient buffers significantly dominate the size of the circuit area in designing two-dimensional (2D) DWT circuit. The image data scanning method adopted by the circuit significantly dominates the power consumption performance.

Refer to FIG. 5a and FIG. 5b. In FIG. 5a and FIG. 5b a 1-level 2-dimensional DWT system is used an example. 1-level means that the DWT circuit analyzes one level of the two-dimensional image at a time. In other words, the DWT circuit uses a two-dimensional (2-D) DWT module.

The 2-D DWT circuit comprises an external memory 700 and a 2-D DWT module 701. The size of the external memory 700 must be N/2×N/2 words. However, the 2-D DWT module 701 needs a temporal coefficient buffer 702 to store temporal reusable data and with a size of K×N words, wherein K represents a number of necessary temporal buffers adopted by the 2-D DWT module 701. The number of the temporal buffers depends on the DWT circuit adopted by the system.

Refer to FIG. 6. FIG. 6 illustrates the data processing process. For processing a 2-D image, each step performs a 1-D row DWT and a 1-D column DWT for the 2-D image and outputs the data after the completion of both 1-D DWTs. The HH (high pass outputs in both row and column) data, HL (low pass outputs in both row and column) data, and LH (low pass output in row and high pass in column) data can be directly outputted when outputting the computation result. The LL data should be determined whether it meets the demands of resolution or not. If the LL data has not reached the demands, then the LL data should be restored into the external memory 700 for the next transforming computation.

Therefore, the conventional 2-D DWT scheme must use the external memory 700 to transpose data. The use of the external memory 700 increases the hardware expense and the size of the circuit area.

Therefore, there is a need to provide an improved DWT architecture to mitigate or obviate the aforementioned problems.

SUMMARY

An object of the present invention is to provide a method of processing digital image data with a discrete wavelet transform algorithm, such that the method reduces the critical path.

Another object of the present invention is to provide an apparatus of processing digital image data with discrete wavelet transform algorithm, and the apparatus will reduce hardware expense.

An apparatus in accordance with the present invention includes a first multiplier, a second multiplier and multiple adders. The first multiplier uses T(2n) time terms along a time axis to process the hardware timing for the processing of the image data to generate a first product and T(2n+1) time terms to generate a second product. The second multiplier uses T(2n) time terms to process the hardware timing for the processing of the image data to generate a third product and T(2n+1) time terms to generate a fourth product. The adders selectively process the products with addition operations. The n is a zero or an integer, the time terms of T(2n+1) are the odd time points along the time axis, and the time terms of T(2n) are the even time points along the time axis.

Therefore, exchanging the first product and the second product of the first multiplier renders common products for sequel additions of the adders. Exchanging the third product and the fourth product of the second multiplier renders common products for sequel additions of the adders. The method in accordance with the present invention comprises several steps.

Step 1 uses the time terms T(2n+1) of a first and a second adders, and the time terms of T(2n) of the first multiplier to process the hardware timing for the processing of the image data.

Step 2 uses the T(2n+1) time terms of a third adders, and the T(2n) time terms of the second multiplier and a fourth adder to be to process the hardware timing for the processing of the image data.

Step 3 uses the T(2n) time terms of the first and the second adders, and the T(2n+1) time terms of the first multiplier to process the hardware timing for the processing of the image data.

Step 4 uses the T(2n) time terms of the third adder, and the T(2n+1) time terms of the second multiplier and the fourth adder to process the hardware timing for the processing of the image data.

Step 5 multiplies computation result in step 3 to obtain detailed coefficients.

Step 6 multiplies computation result in step 4 to obtain smooth coefficients. Preferably, the method uses a non-overlapped stripe-based scanning method to accomplish 2-D DWT.

Consequently, the hardware processing timing of the multipliers and the adders are staggered, which results in the need for two multipliers and four adders, with using a control circuit to change the product to accomplish one-dimensional discrete wavelet transform for the image. The critical path of the apparatus has been improved.

Besides, when the present invention is applied to two-dimensional discrete wavelet transform circuits, it eliminates a requirement of using a transposing buffer, which provides a smaller circuit area in size and simplified system configuration.

BRIEF DESCRIPTION OF THE DRAWINGS

These and other features, aspects, and advantages of the present invention will become better understood with regard to the following description, appended claims, and accompanying drawings where:

FIG. 11b is a circuit diagram of the low area 2-D DWT in FIG. 11a; and

DESCRIPTION OF THE PREFERRED EMBODIMENTS

Figure 1:
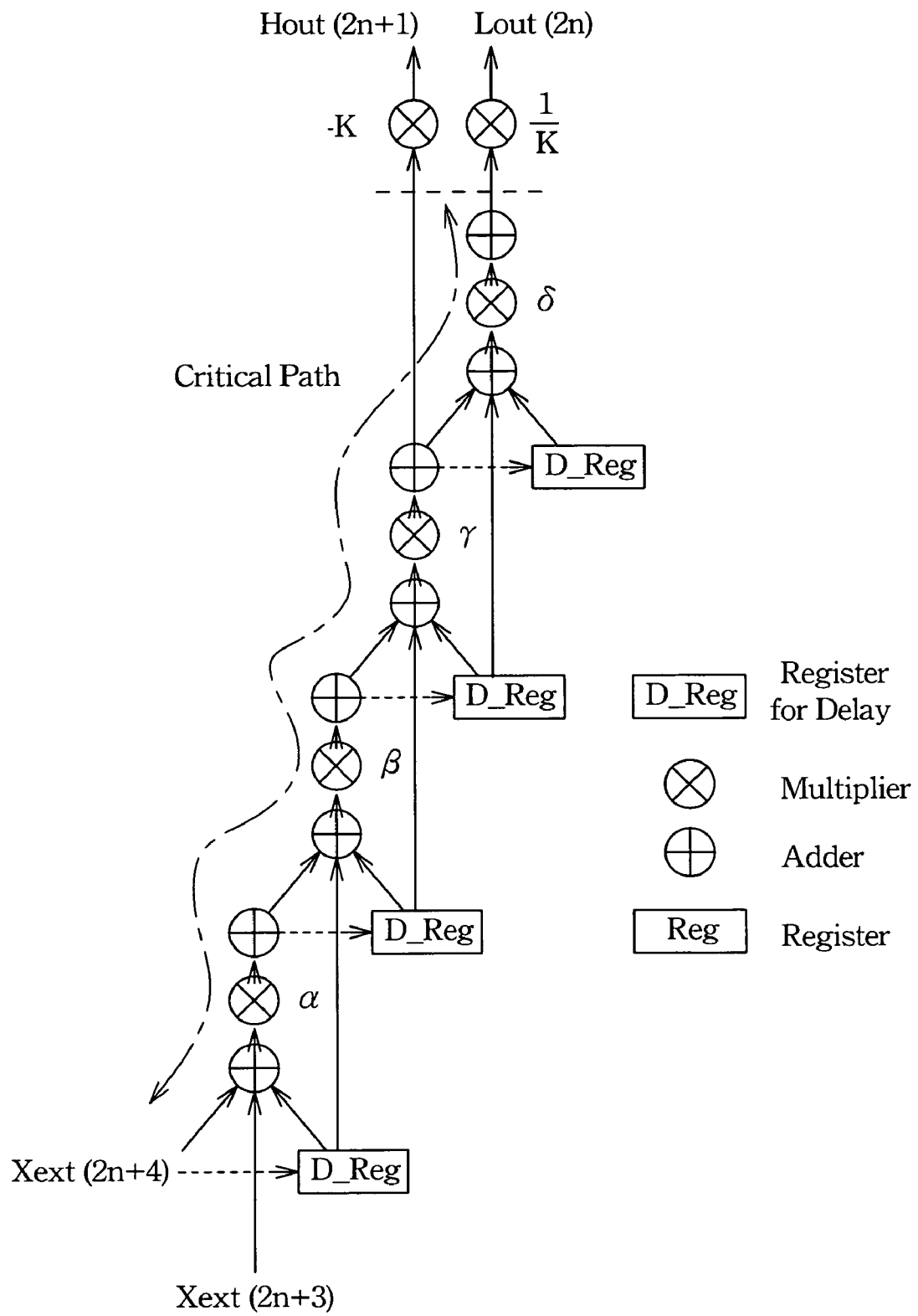
FIG. 1 is a schematic circuit diagram of a lifting scheme in accordance with prior art.
Figure 2:
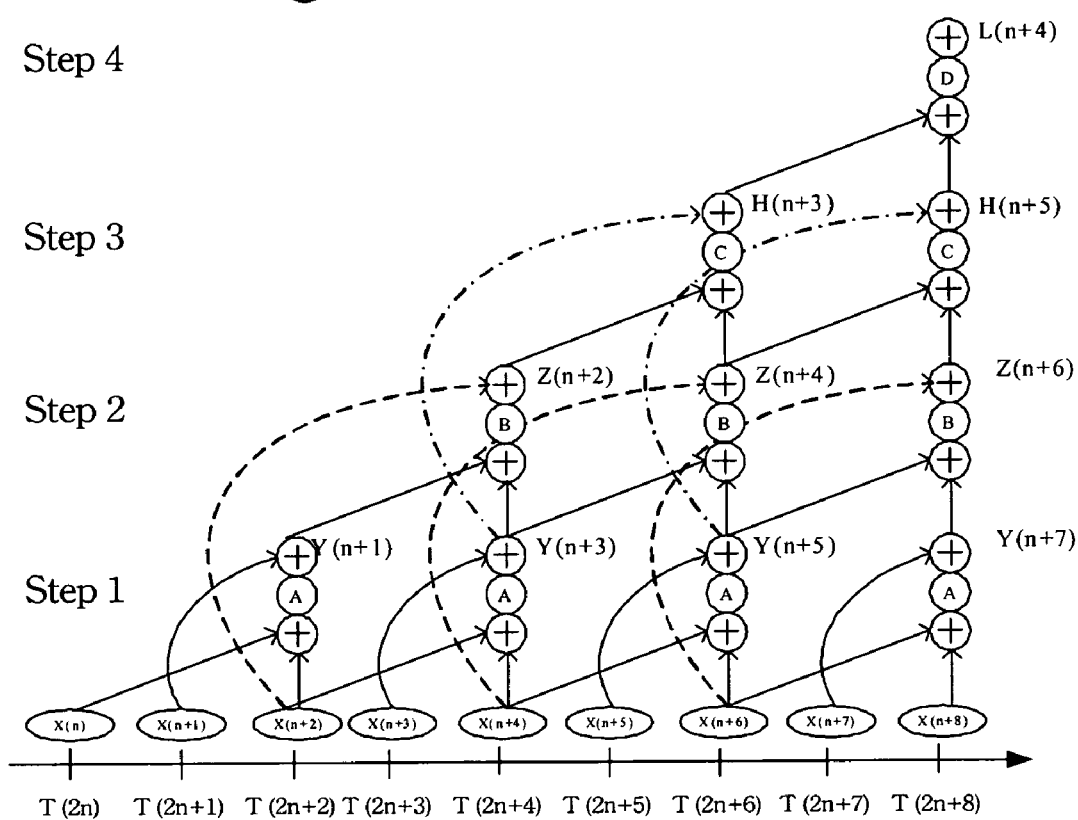
FIG. 2 is an analytic diagram of the algorithm of the lifting scheme in accordance with prior art, when the lifting scheme is used to accomplish forward 9/7 DWT.
Figure 3:
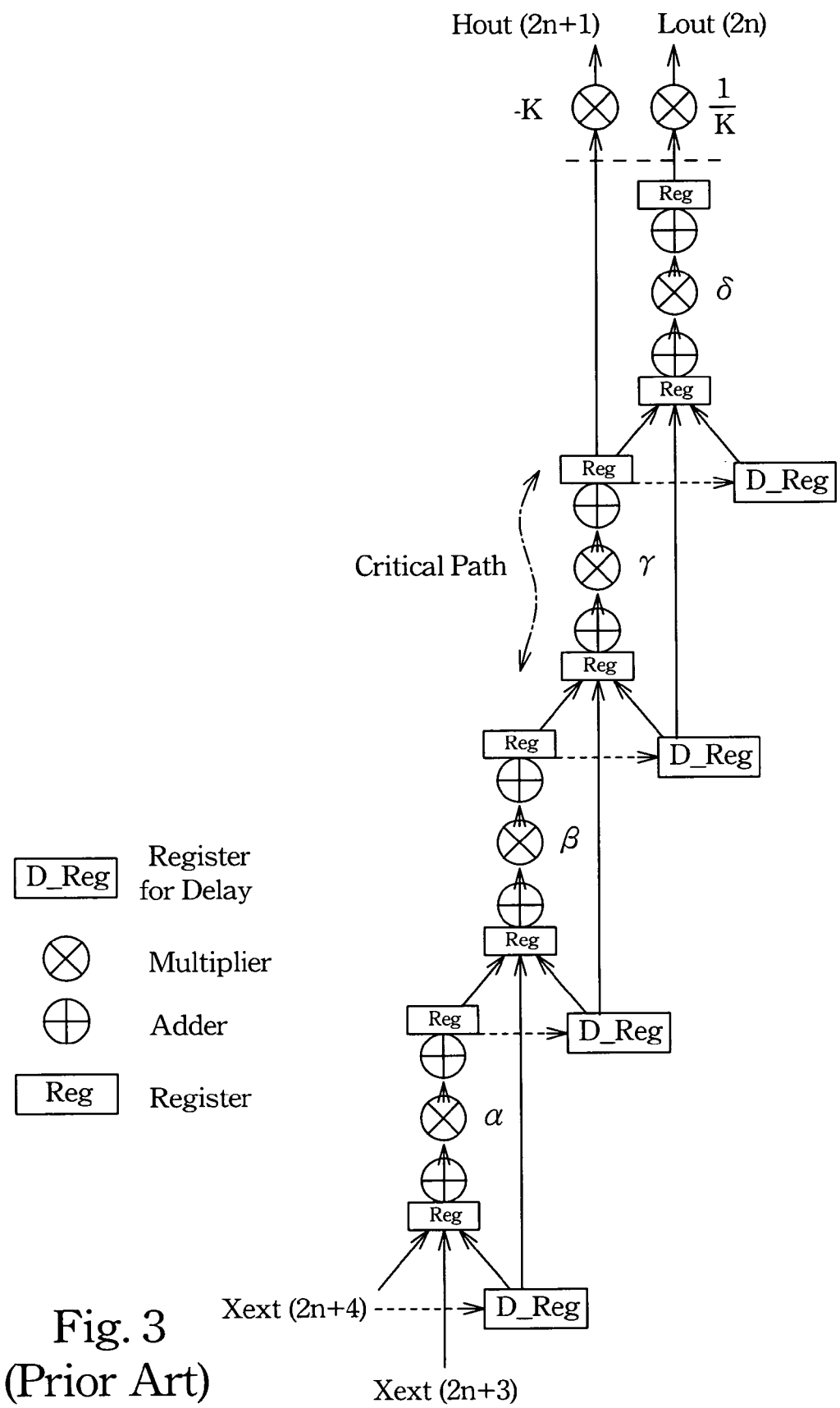
FIG. 3 is a schematic circuit diagram of a pipeline lifting scheme in accordance with prior art.
Figure 4:
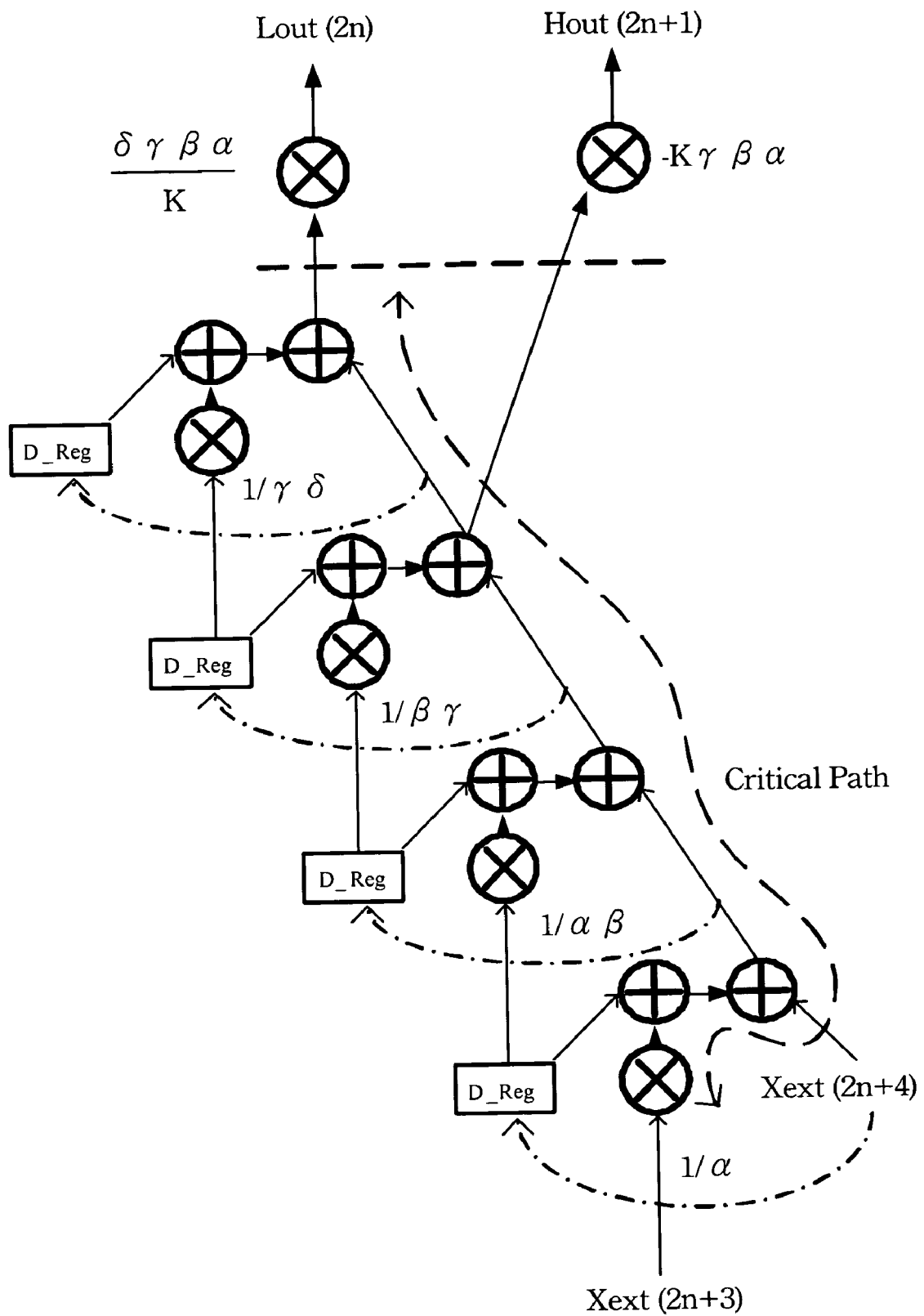
FIG. 4 is a schematic circuit diagram of a Flipping scheme in accordance with prior art.
Figure 5A:
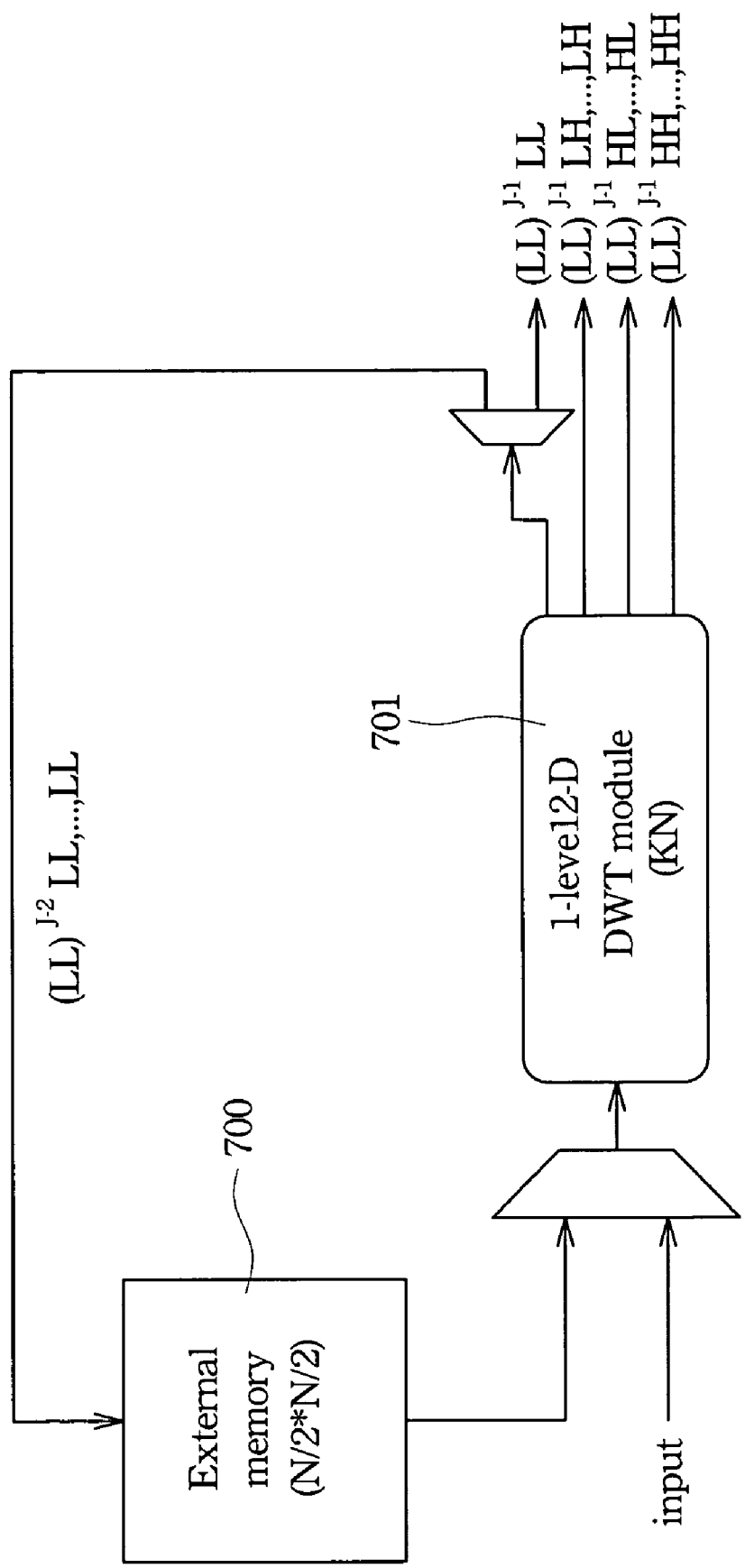
FIG. 5a is a schematic circuit diagram of a one-level two-dimensional DWT in accordance with prior art.
Figure 5B:
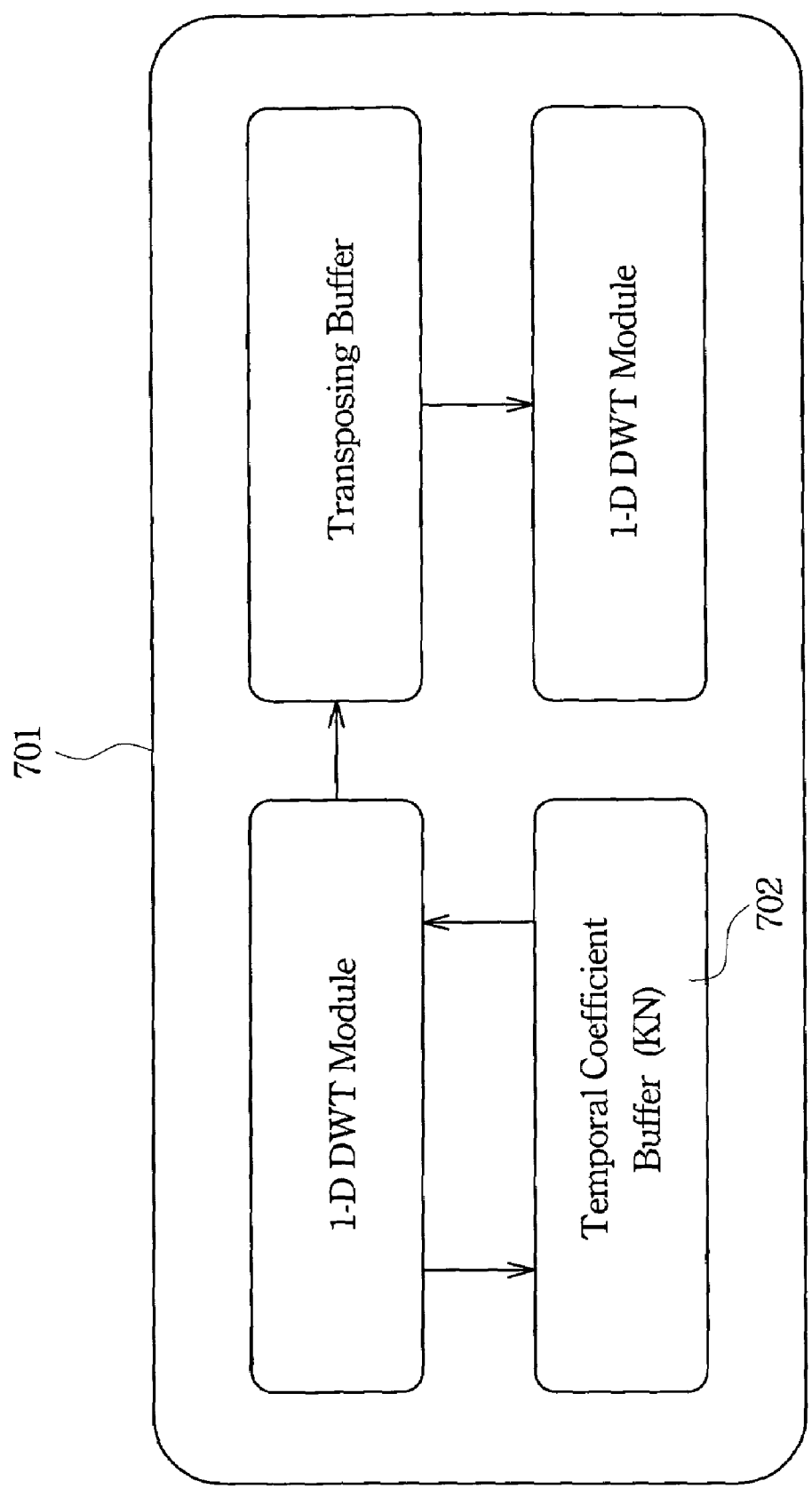
FIG. 5b is a schematic system diagram of the one-level two-dimensional DWT in FIG. 5b.
Figure 6:
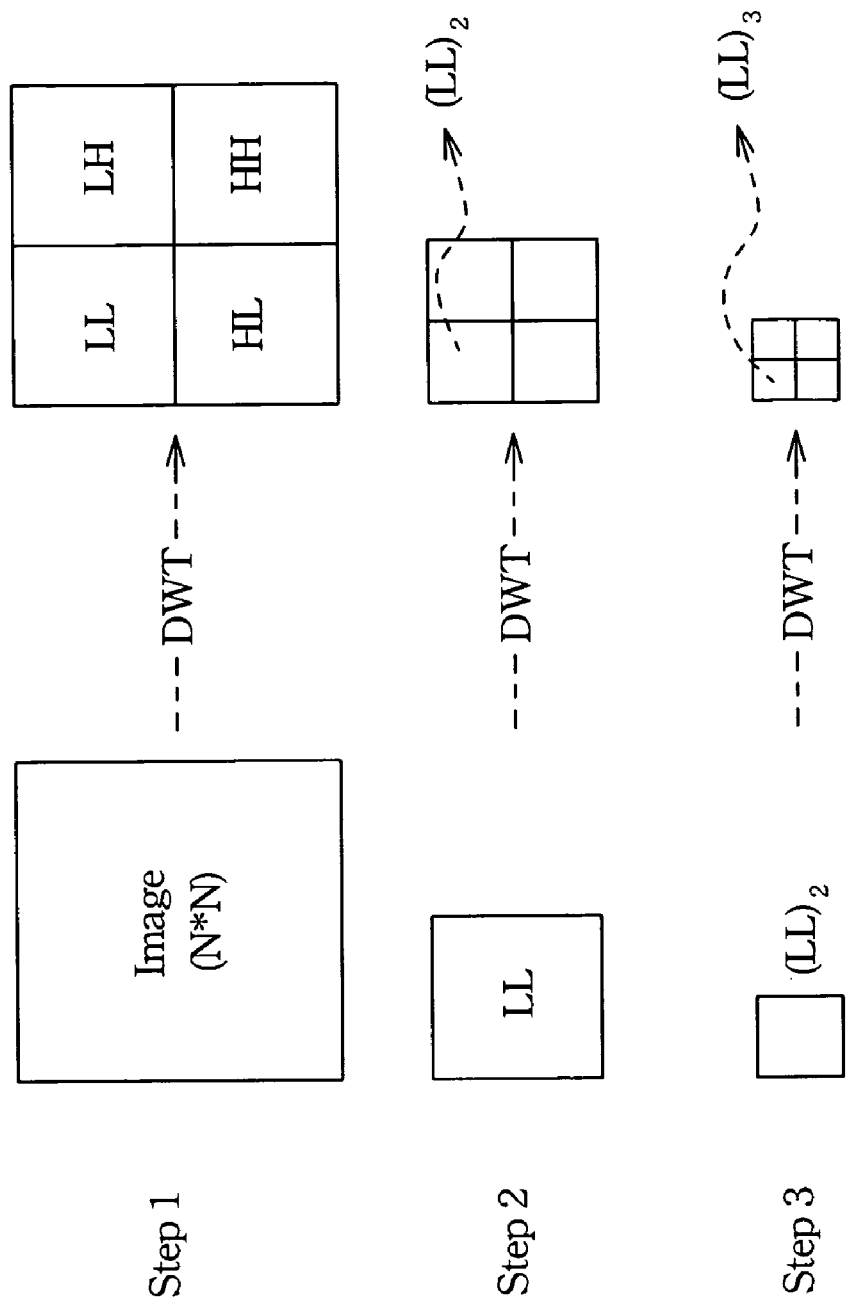
FIG. 6 is a schematic data processing flow diagram of the one-level two-dimensional DWT in accordance with prior art.

Reference will now be made in detail to the present preferred embodiments of the invention, examples of which are illustrated in the accompanying drawings. Wherever possible, the same reference numbers are used in the drawings and the description to refer to the same or like parts.

Figure 7:
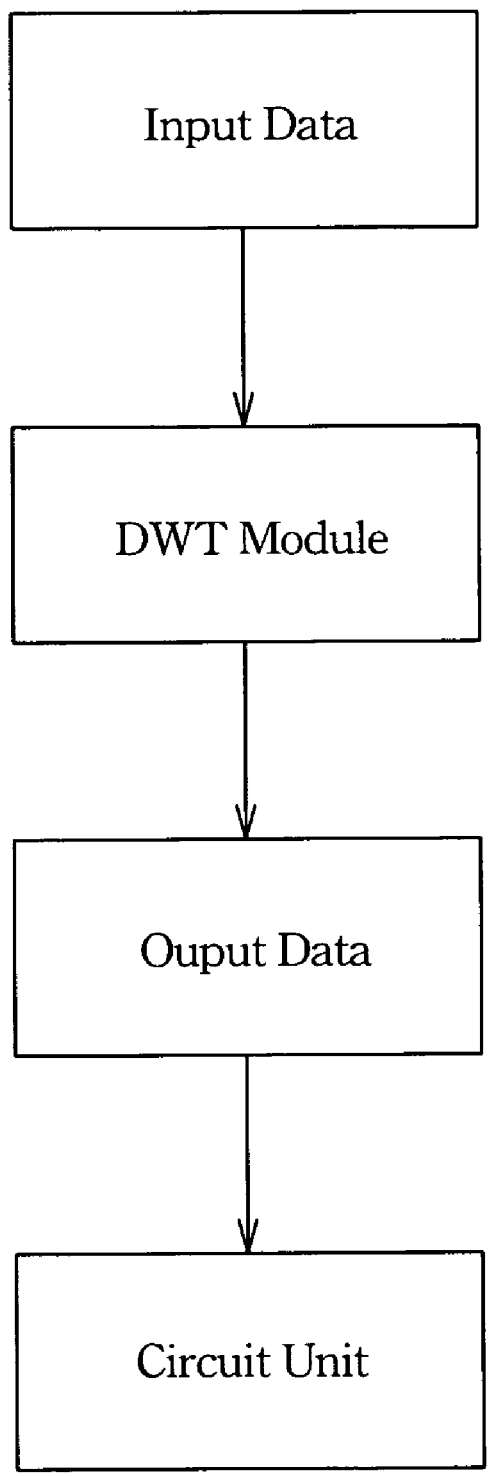
FIG. 7 is a flow chart of a DWT method in accordance with the present invention.

Refer to FIG. 7. FIG. 7 is a flow diagram in accordance with the present invention. The embodiment of the present invention takes a forward 9/7 discrete wavelet transform module complying with the JPEG 2000 compression standard for example. The input data, such as an image, is transformed by the DWT module, which generates the output data. The output data is stored in an appropriate circuit unit.

In using the lifting scheme to complete 9/7 DWT, the equation (1) $Y(2n+1) \leftarrow X_{ext}(2n+1) + \alpha \times [X_{ext}(2n) + X_{ext}(2n+2)]$ as described in the conventional lifting scheme can be rewritten as, $$Y(2n+1) \leftarrow \alpha \times X_{ext}(2n) + X_{ext}(2n+1) + \alpha \times X_{ext}(2n+2) \quad (7)$$

The method in accordance with the present invention is to use the common product of sequel terms in the equation (7) to eliminate the circuit being idle. The circuit needs to process data computation including addition and multiplication at each time term, where each time term represents a time point along the time axis so that the flow processing performance is efficiently improved. The DWT circuit computes simultaneously the data at both T(2n) and T(2n+1) time terms along the time axis. If two records of $X_{ext}(2n)$ and $X_{ext}(2n+1)$ can be simultaneously processed, the data computation time is saved. Meanwhile, the computation flow of the DWT algorithm will not increase multiplication times.

Taking the algorithm for example, if n=0 and n=1 are respectively loaded into the equation (7), then the equation (8) and (9) can be obtained as, $$Y(1) \leftarrow \alpha \times X_{ext}(0) + X_{ext}(1) + \alpha \times X_{ext}(2) \quad (8)$$

$$Y(3) \leftarrow \alpha \times X_{ext}(2) + X_{ext}(3) + \alpha \times X_{ext}(4) \quad (9)$$

wherein, the product of $\alpha \times X_{ext}(2)$, i.e. the product of $\alpha \times X_{ext}(2n)$ can be the common product for the sequel equations (8) and (9).

Figure 8A:
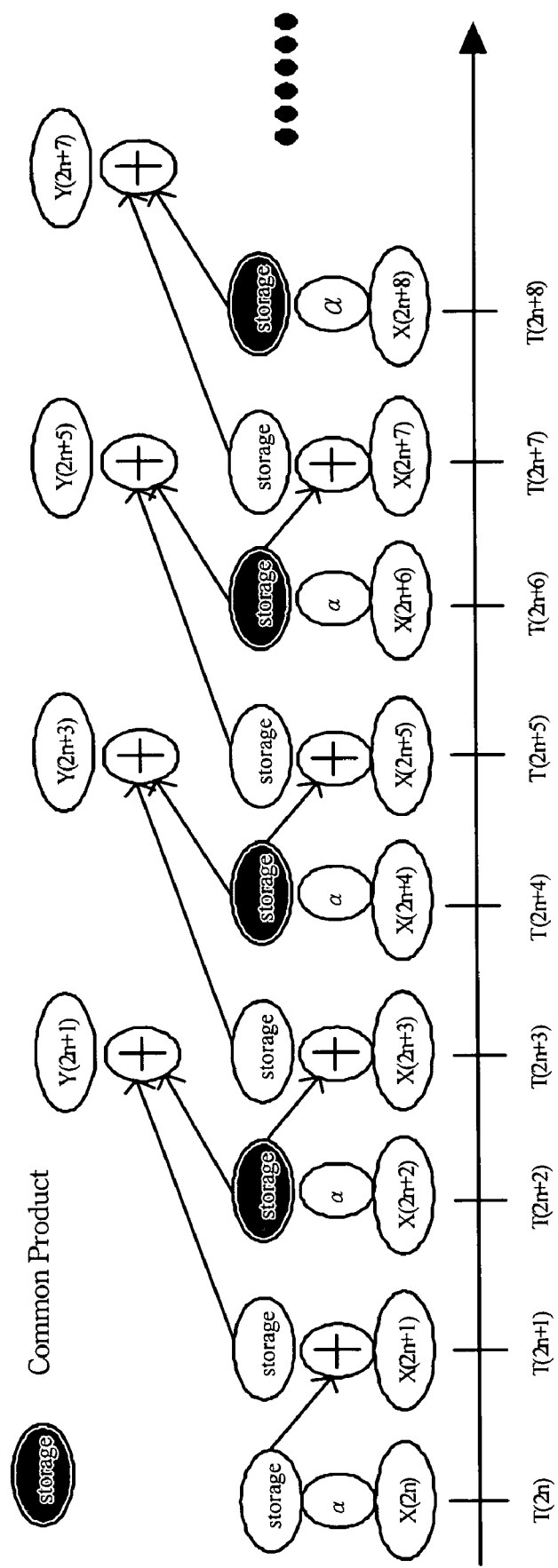
FIG. 8a is an analytic diagram of the DWT method in accordance with the present invention.

Refer to FIG. 8a. FIG. 8a shows the first step of the algorithm generally uses the T(2n+1) time terms of the two adders and the T(2n) time terms of the one multiplier by means of the common product of the sequel equations, where the time terms of T(2n+1) are the odd time points along the time axis, the time terms of T(2n) are the even time points along the time axis, and n is zero or and an integer.

Figure 8B:
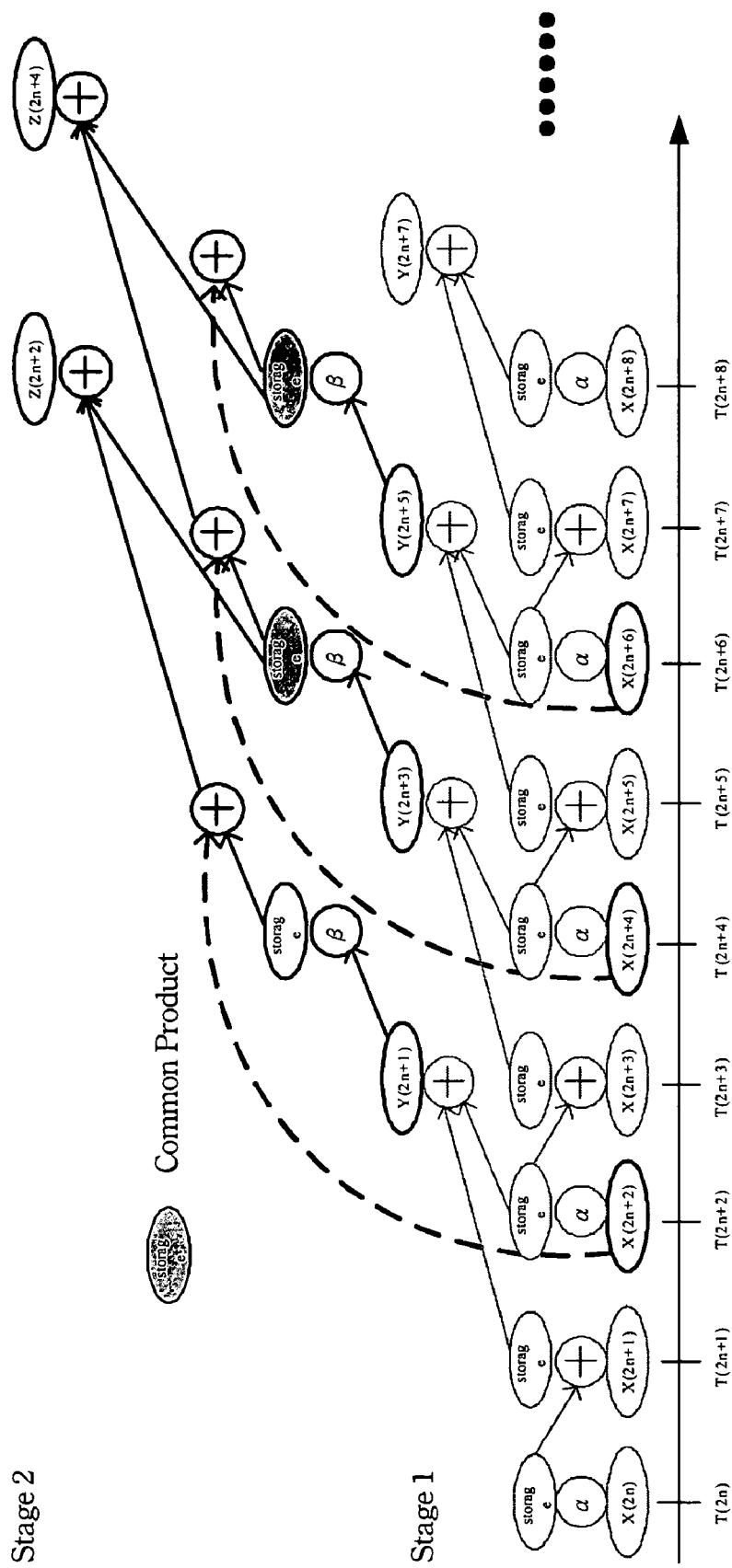
FIG. 8b is an analytic diagram of the DWT method in accordance with the present invention.

Refer to FIG. 8b. FIG. 8b shows the second step of the algorithm generally uses the T(2n+1) time terms of one adder and the T(2n) time terms of the one multiplier and one adder to process hardware timing. The hardware timing of the multiplier is the same between the first and the second steps.

Figure 8C:
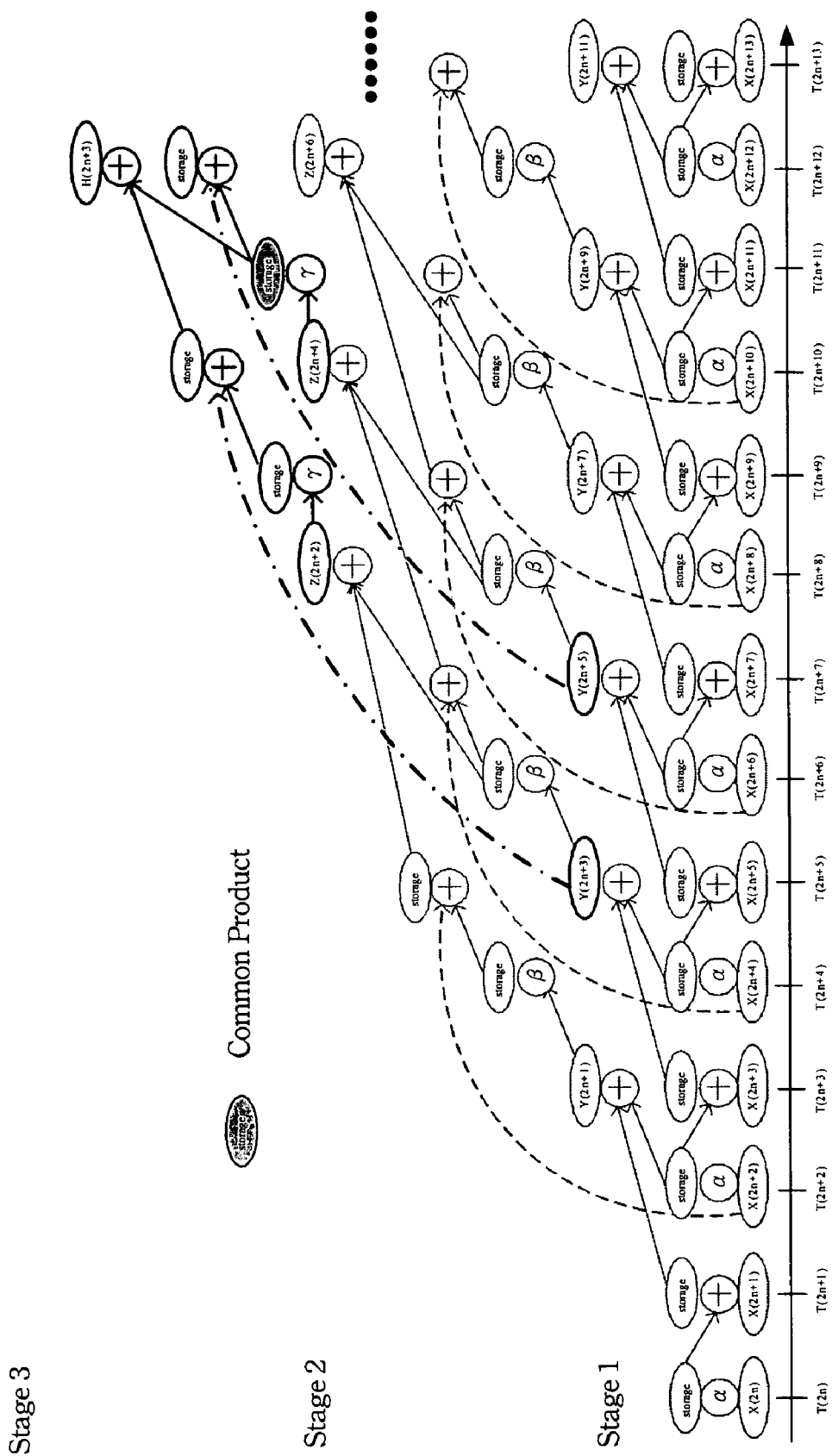
FIG. 8c is an analytic diagram of the DWT method in accordance with the present invention.

Refer to FIG. 8c. FIG. 8c shows the third step of the algorithm can do the same modification. The third step generally uses the T(2n) time terms of two adders and the T(2n+1) time terms of one multiplier. The hardware timing of the computational components in the third step is staggered with respect to the first and the second steps. For example, in the odd time point T(n+11) along the time axis, the first stage uses two adders, while the second stage uses simultaneously one adder and the third stage uses simultaneously the multiplier for r coefficient. In the even time point T(n+12) along the time axis, the first stage uses the multiplier for α coefficient, while the second stage uses simultaneously one adder and the multiplier for β coefficient, and the third stage uses simultaneously two adders.

Therefore, the multiplier can be commonly used for different coefficients in the first stage and third stage by exchanging its coefficients with setting the even time points for the coefficient α and the odd time points for the coefficient γ.

Figure 8D:
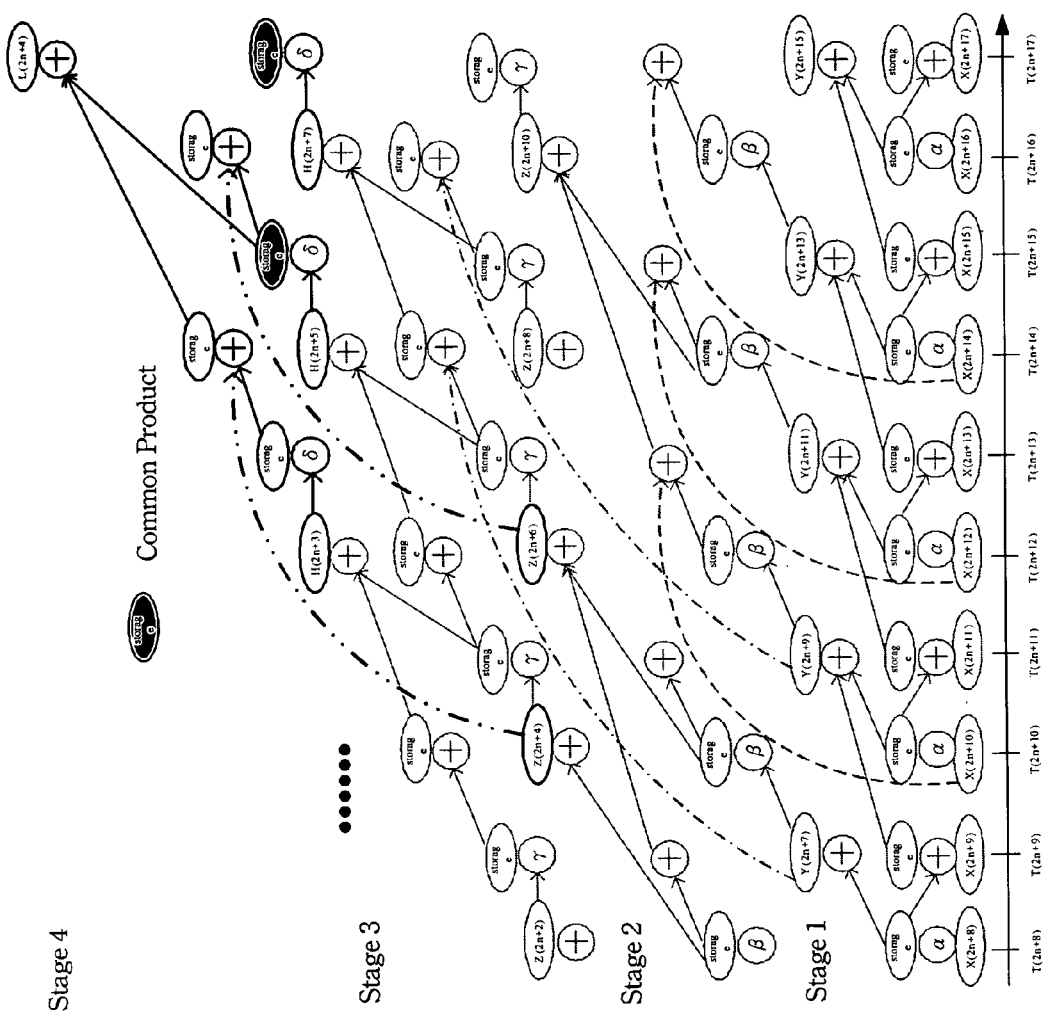
FIG. 8d is an analytic diagram of the DWT method in accordance with the present invention.

Refer to FIG. 8d. FIG. 8d shows the fourth step of the algorithm. It generally uses the T(2n) time terms of one adder, and the T(2n+1) time terms of the one multiplier and one adder. The hardware timing of the fourth step is staggered with respect to the first and the second steps. For example, in the even time point T(n+16) along the time axis, the first stage uses the multiplier for coefficient α, while the second stage uses simultaneously the multiplier for coefficient β and one adder, the third stage uses simultaneously two adders and the fourth stage uses simultaneously one adder. In the odd time point T(n+17), the first stage uses two adders, while the stage use simultaneously one adder, the third stage uses simultaneously the multiplier for coefficient γ, and the fourth stage uses simultaneously the multiplier for coefficient δ and one adder.

Therefore, the first multiplier can be commonly used for first stage and third stage by exchanging its coefficients with setting the even time points for the coefficient α and the odd time points for the coefficient γ. Likewise, the second multiplier can be commonly used for second stage and fourth stage by exchanging its coefficients with setting the even time points for the coefficient β and the odd time points for the coefficient δ. Thus, the computation results of the aforesaid steps are multiplied by corresponding coefficients (i.e. K or 1/K) to obtain respectively detailed coefficients and smooth coefficients.

Figure 9:
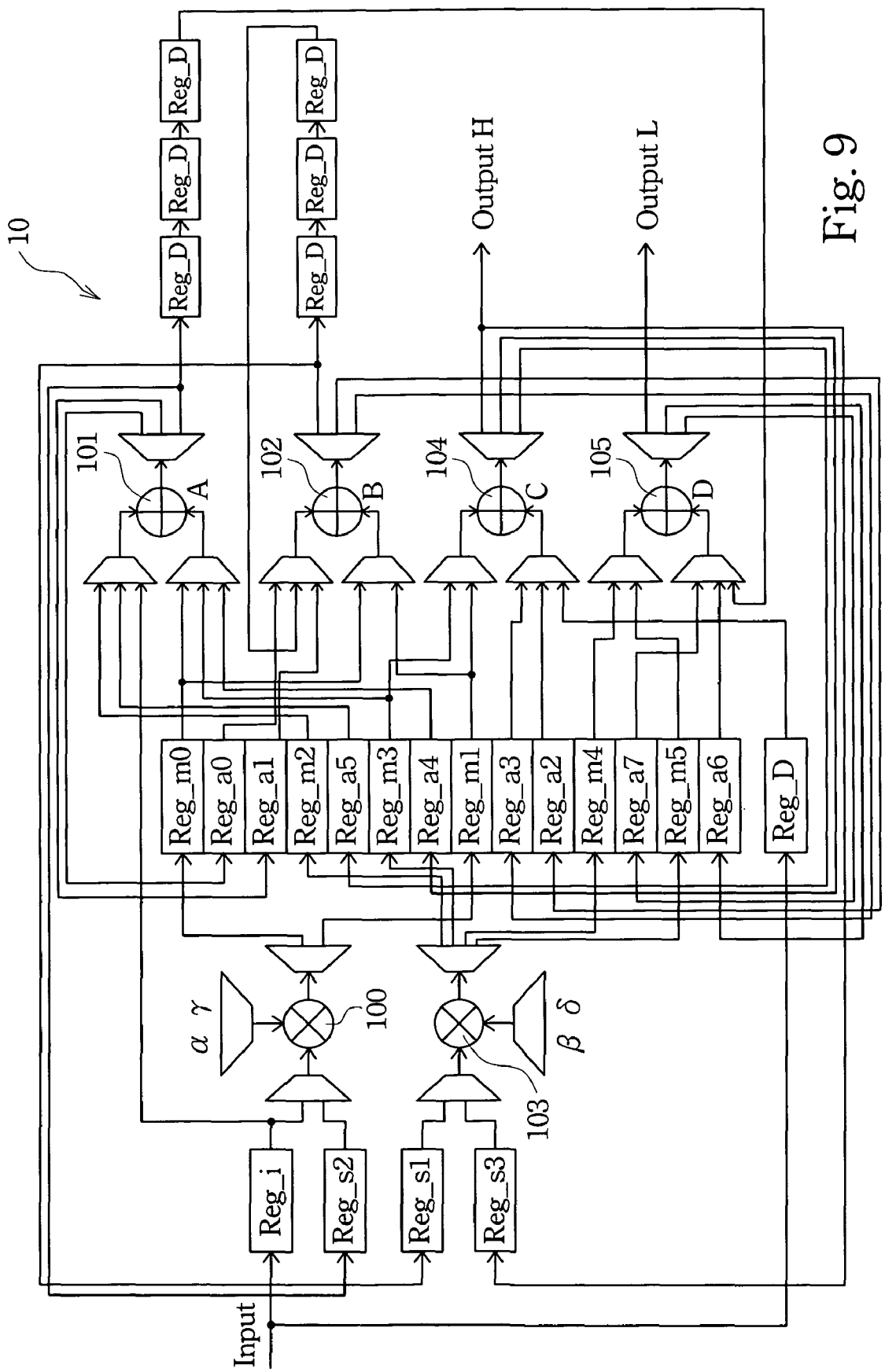
FIG. 9 is a circuit diagram of the DWT method in accordance with the present invention.

Consequently, this embodiment only needs two multipliers and four adders to accomplish the 1-D DWT algorithm with a control circuit to exchange the product of the multipliers. The latency of the critical path becomes only the computation time of one multiplier. Refer to FIG. 9. FIG. 9 shows, the digital image processing apparatus 10 in accordance with the present invention to compute the 1-D forward 9/7 DWT. The digital image processing apparatus 10 in FIG. 9 comprises a first multiplier 100, a second multiplier 103, a first adder 101, a second adder 102, a third adder 104 and a fourth adder 105. The first and the second adders 101 and 102 use the time terms of T(2n+1) for the hardware processing time, while the first multiplier 100 uses the time terms of T (2n) for the hardware processing time. The third and the fourth adders 104, 105 use the time terms of T(2n) for the hardware processing time, while the second multiplier 103 uses the time terms of T (2n+1) for the hardware processing time. "n" is an integer, the time terms of T(2n+1) are odd time points along the time axis, and the time terms of T(2n) are even time points along the time axis. Besides, the present invention can be used to accomplish not only the forward 9/7 DWT, but also the forward 5/3 DWT.

Figure 10:
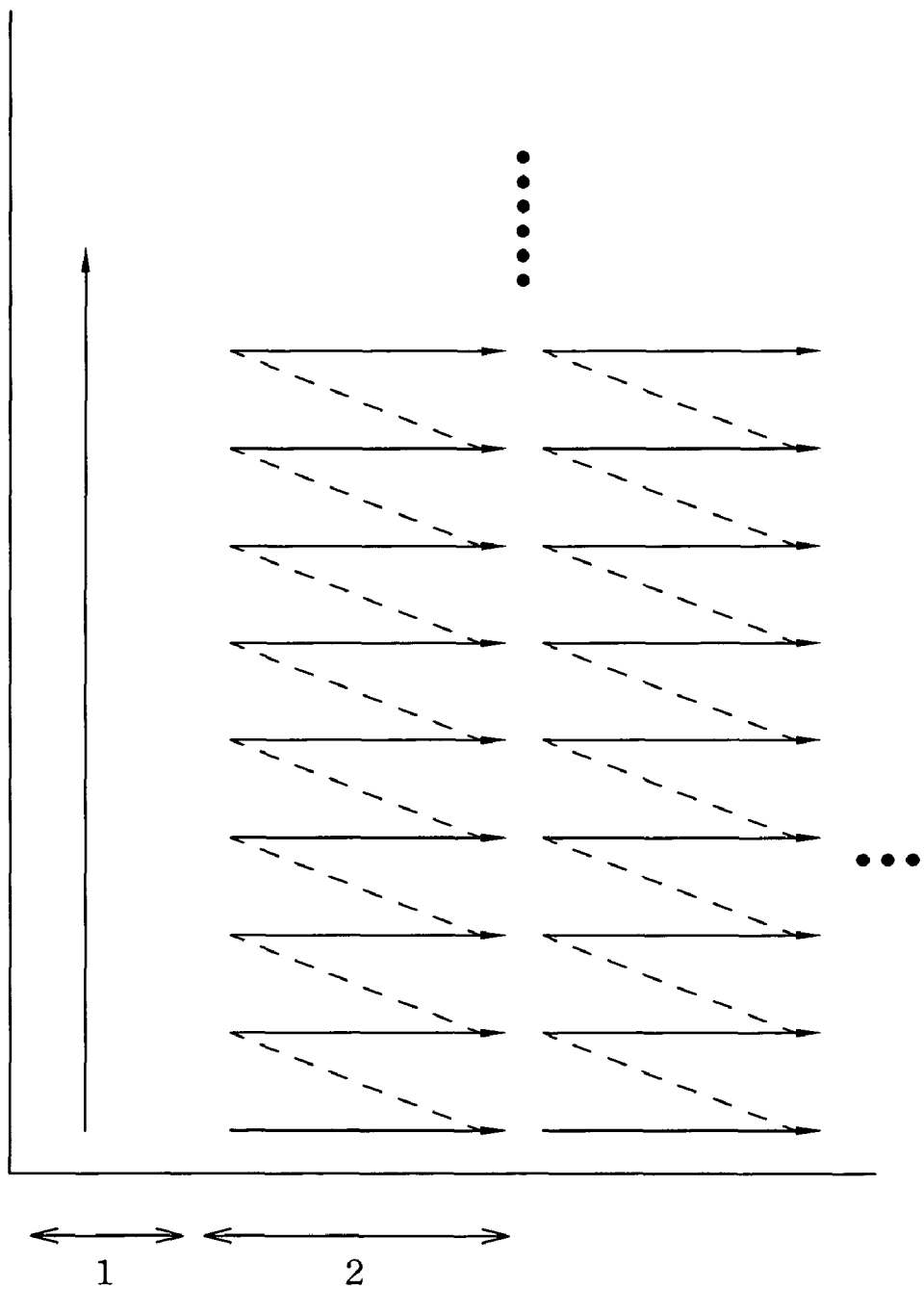
FIG. 10 is a schematic diagram of a scanning method for low area DWT.

With reference to FIG. 10, the preferred embodiment adopts non-overlapped stripe-based scanning method for the 2-D DWT circuit. The scanning method starts to scan the first row, and waits for the completion of the inputting of first row data. Then, the scanning method starts to scan a group of two rows of non-overlapped stripe-based scanning inputs.

Figure 11A:
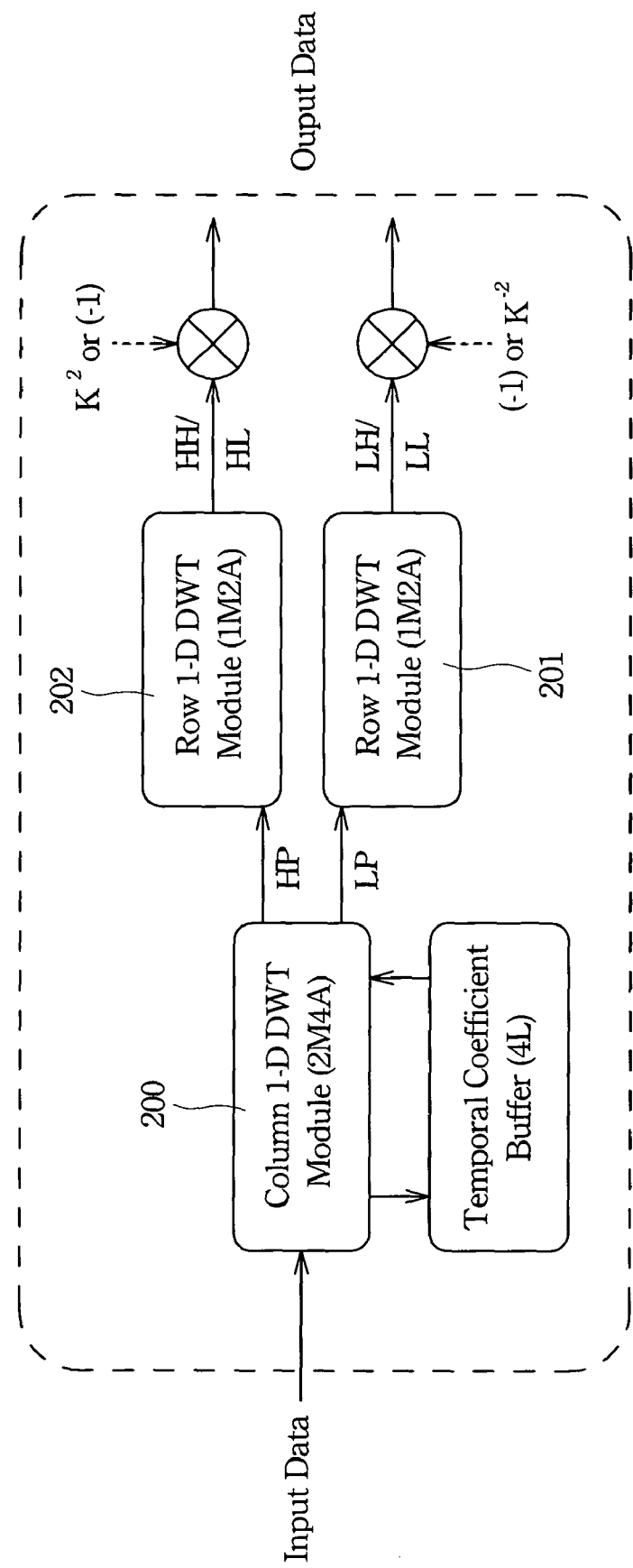
FIG. 11a is a schematic system diagram of a low area 2-D DWT in accordance with the present invention.
Figure 11B:
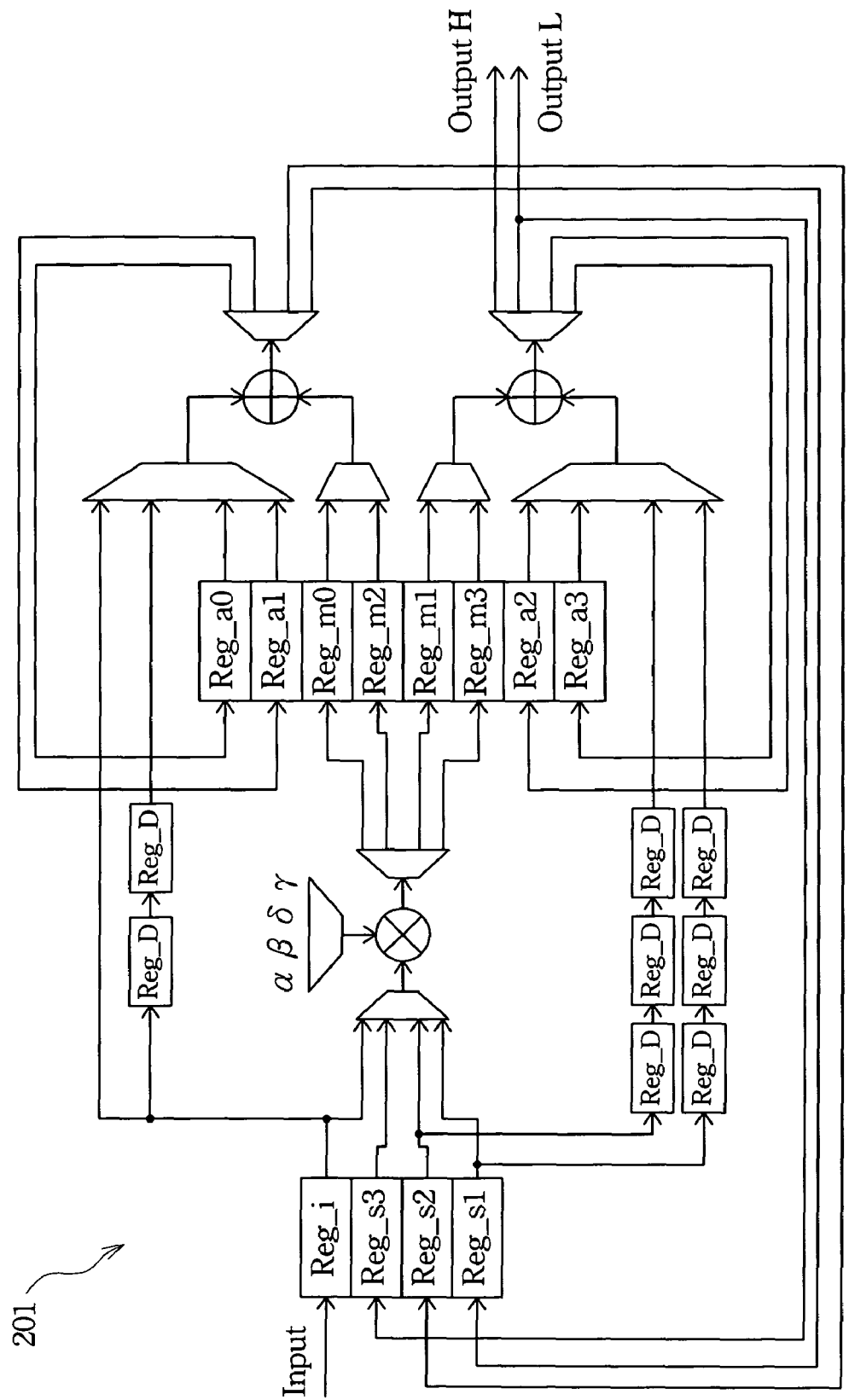

Refer to FIG. 11a and FIG. 11b. FIG. 11a and FIG. 11b illustrate a schematic diagram of the 2-D DWT in accordance with the present invention. The input data sequence is processed by a column 1-D DWT unit 200 in advance to perform the column process. The letter M in blocks in the FIG. 11a represents a number of adopted multipliers, and the letter A in blocks in the FIG. 11a represents a number of adopted adders. When the computation of the 1-D column DWT has been completed, the analytic outputs including low pass output and high pass output are respectively sent to a low pass row DWT module 201 and a high pass DWT module 202.

There is no different if row processing or column processing is being taken in advance for the image for dealing with the 2-D DWT. However, a transposing buffer is required to temporally store the transformed data of the image when one direction of the image has been completed by the 1-D DWT, and the transformed data are transformed to another direction of the image. The transposing buffer for the transformed data needs 1.5N words in size, where N is the length of the image. Using the non-overlapped stripe-based scanning method can eliminate the required transposing buffer used in the 2-D DWT circuit.

Figure 12:
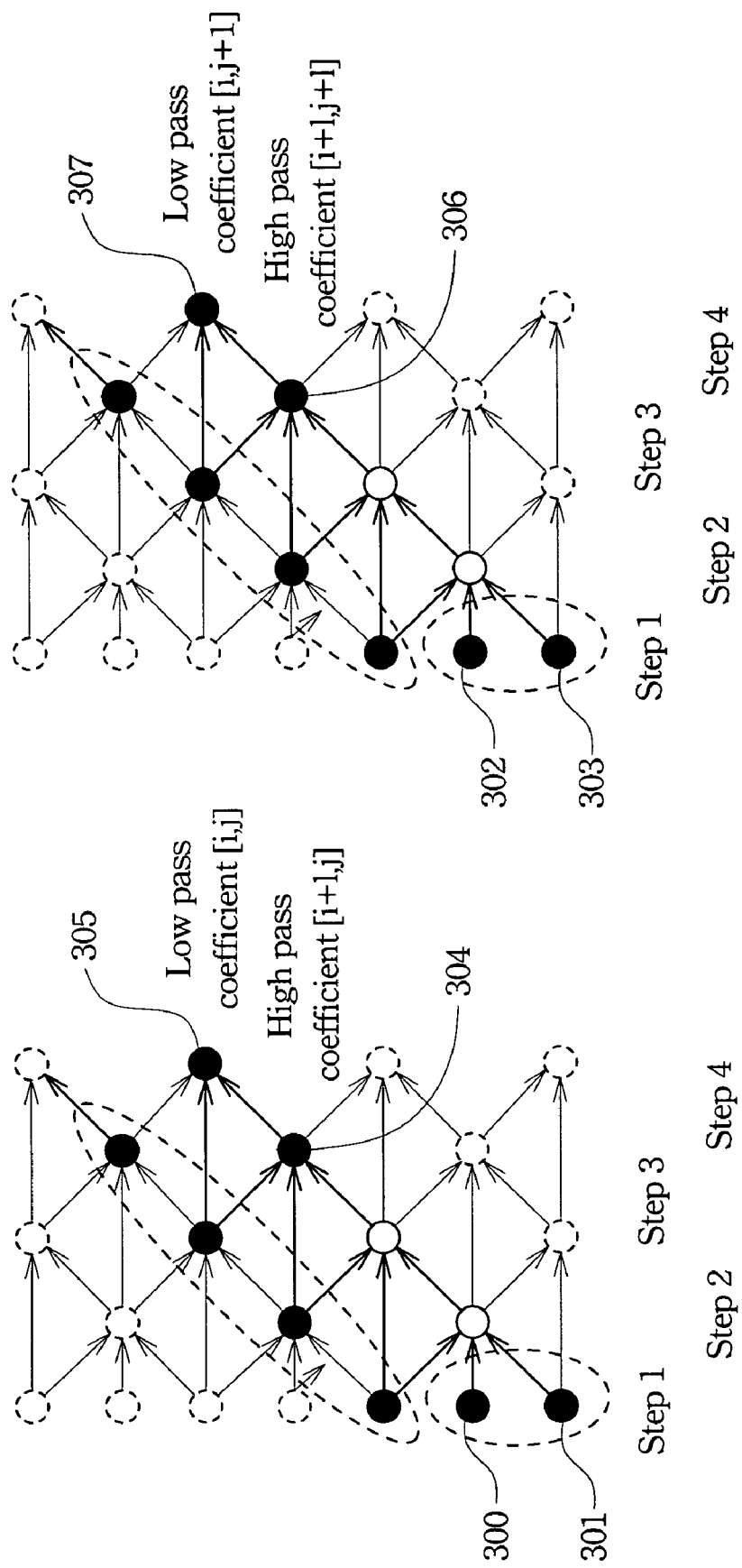
FIG. 12 is a schematic flow diagram of processing 2-D data in accordance with the present invention.

With further reference to FIG. 12, two pieces of sequel image data 300,301 of the j-th column are inputted. Then, two pieces of sequel image data 302 and 303 of the j+1th column in the same row are inputted. Therefore, the outputs of the column DWT module 200 generates the high pass output 304 at the position [i+1, j] in advance, and then generates the low pass output 305 at position [i, j], the high pass output 306 at position [i+1, j+1] and the low pass output 307 at position [i, j+1] in sequence. Only high pass outputs or low pass outputs can be recognized at every period of two pulses and generate the transformed data in the same row but different columns. Consequently, there is no need to have a transposing buffer to temporally store the data transmitted to the row DWT modules 201 and 202. Not having a transposing buffer results in reducing the circuit area into a smaller size.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for processing image data, comprising
   (a) providing a first multiplier, a second multiplier, a first adder, a second adder, a third adder and a fourth adder, with respect to a hardware processing timing with multiple time terms, with respect to a time axis having multiple time points, wherein a T(2n+1) group of the time terms are the odd time points along the time axis and a T(2n) group of the time terms are the even time points along the time axis, where n is a zero or an integer;
   (b) using the T(2n+1) time terms of the first and the second adders, and the T(2n) time terms of the first multiplier to process the hardware timing, and thus generating a first stage data Y based on a source image data $X_{ext}$;
   (c) using the T(2n+1) time terms of the third adders, and the T(2n) time terms of the second multiplier and the fourth adder to process the hardware timing, and thus generating a second stage data Z based on the first stage data Y and the source image data $X_{ext}$;
   (d) using the T(2n) time terms of the first and the second adders, and the T(2n+1) time terms of the first multiplier to process the hardware timing, and thus generating a third stage data H based on the first stage data Y and the second stage data Z;
   (e) using the T(2n) time terms of the third adder, and the T(2n+1) time terms of the second multiplier and the fourth adder to process the hardware timing, and thus generating a fourth stage data L based on the second stage data Z and the third stage data H;
   (f) multiplying the third stage data H with a first corresponding coefficient to obtain detailed coefficients; and
   (g) multiplying the fourth stage data L with a second corresponding coefficient to obtain smooth coefficients.

2. The method as claimed in claim 1, wherein the method is used to accomplish a forward 9/7 discrete wavelet transform.

3. The method as claimed in claim 1, wherein the method is used to accomplish a forward 5/3 discrete wavelet transform.

4. The method as claimed in claim 1, wherein the method is used to accomplish a two-dimensional discrete wavelet transform.

5. The method as claimed in claim 1, wherein the two-dimensional discrete wavelet transform is accomplished by a non-overlapped stripe-based scanning method.

6. An apparatus for processing image data, comprising
   a first multiplier having T(2n) time terms along a time axis to process a hardware timing for the processing of the image data to generate a first product and T(2n+1) time terms to generate a second product;
   a second multiplier having T(2n) time terms to process the hardware timing for the processing of the image data to generate a third product and T(2n+1) time terms to generate a fourth product; and
   multiple adders selectively processing the products with addition operations;
   wherein n is a zero or an integer, the T(2n+1) time terms are the odd time points along the time axis, and the T(2n) time terms are the even time points along the time axis;
   whereby exchanging the first product and the second product of the first multiplier renders common products for sequel additions of the adders and exchanging the third product and the fourth product of the second multiplier renders common products for sequel additions of the adders.

7. The apparatus as claimed in claim 6, wherein the apparatus is used to accomplish a forward 9/7 discrete wavelet transform.

8. The apparatus as claimed in claim 6, wherein the apparatus is used to accomplish a forward 5/3 discrete wavelet transform.

9. The apparatus as claimed in claim 6, wherein the apparatus is used to accomplish a two-dimensional discrete wavelet transform.

* * * * *